United States Patent [19]

Converse

[11] 4,335,345
[45] Jun. 15, 1982

[54] CURRENT LIMITING CIRCUIT FOR SWITCHING REGULATOR

[75] Inventor: Merle E. Converse, Helotes, Tex.

[73] Assignee: Transaction Control Industries, Bryan, Tex.

[21] Appl. No.: 195,666

[22] Filed: Oct. 9, 1980

[51] Int. Cl.³ .............................................. G05F 1/44
[52] U.S. Cl. .................................................. 323/278
[58] Field of Search .................. 361/18; 323/278, 282, 323/285, 303

[56] References Cited

U.S. PATENT DOCUMENTS

| | | | |
|---|---|---|---|
| 3,748,569 | 7/1973 | Frank et al. | 361/18 X |
| 4,013,925 | 3/1977 | Tice et al. | 361/18 |
| 4,058,758 | 11/1977 | Peterson | 363/56 X |

*Primary Examiner*—William M. Shoop
*Attorney, Agent, or Firm*—Gale R. Peterson; Donald R. Comuzzi

[57] ABSTRACT

A current limiting circuit for a switching regulator comprising a current sensing means operably connected to the positive terminal of a source of unregulated power and switching means operably connecting the positive terminal of said power source to the shut down input signal position of the switching regulator. When said current sensing means detects current in the positive terminal exceeding a predetermined value, the circuit of the present invention causes the switching regulator to adjust downward its duty cycle thereby preventing damage to the switching regulator due to current overload.

5 Claims, 1 Drawing Figure

CURRENT LIMITING CIRCUIT FOR SWITCHING REGULATOR

BACKGROUND OF THE INVENTION

Almost all electronic circuits require a source of direct current (DC) power. Batteries, of course, may be used for low power systems, but generally electronic systems are powered by a power supply which converts alternating current (AC) from commercial power lines to DC power.

Electronic systems, particularly monolithic integrated circuits, are designed to operate over a relatively narrow voltage range. The recent advent of large scale integrated (LSI) and very-large scale integrated (VLSI) technology produces devices particularly susceptible to denegration or less than satisfactory performance when the input voltage varies other than to a slight degree. Unregulated power supplies provide an output voltage which varies with the load, the AC input and temperature. Those variations are devastating to sensitive electronic systems. Accordingly, sensitive electronic systems necessitate the use of a regulated power supply; that is a power supply which is capable of providing a DC voltage output which is independant of the current drawn by the load, of variations in input line voltage, and of temperature.

Various regulated power supplies for electronic circuits have been designed and are in use. Indeed, fixed-voltage regulators of monolithic design, for example the Motorola MC 7800 C series, are currently available. Such regulators provide an industry standard voltage output of, for example, five (5), twelve (12), eighteen (18) or twenty-four (24) volts. The advent of such monolithic regulators has allowed system design whereby unregulated voltage is provided throughout electronic systems and regulation is provided on individual printed circuit boards. Thus, substantial flexibility in design, regulation, isolation and decoupling is possible.

Such regulators (sometimes referred to as series pass regulators), however, suffer from several disadvantages. If the electronic system requires a plurality of differing voltages and there is only one DC supply voltage, system design may prove the addition of multiple unregulated DC voltages uneconomical or impractical. Additionally, in systems where all voltages must be generated from a single DC voltage source, and the system requires multiple different DC voltages, DC-to-DC converters are necessary. Another disadvantage is that such regulators require the input voltage to be greater than the output voltage and are generally inefficient.

The use of a switching regulator obviates those disadvantages. The basic switching regulator consists first of a reference regulator which may be a series pass regulator as described above. The output of that reference regulator is a fixed reference voltage which serves as the power supply voltage for the other circuits in the switching regulator. A difference or error amplifier compares the fixed reference voltage with a fraction of the output voltage of the switching regulator. The output voltage from the difference or error amplifier is applied to the inverting terminal of a pulse width modulator. A triangular wave form is applied to the noninverting terminal of the pulse width modulator. The modulator, in known fashion, thus produces a square wave having a duty cycle which varies linearly with the output voltage of the difference or error amplifier. The output of the pulse width modulator, in known fashion, is connected to drive a power switch thereby creating a square wave having a minimum value of zero and a maximum value equal to the unregulated input voltage to the switching regulator. The output voltage of the switching regulator will therefore be constant and will be regulated by varying the duty cycle of the square wave.

Many switching regulators are, of course, available on the market in single package design. The Silicon General 3524 is such a switching regulator. That switching regulator is useful in power supplies for electronic systems, particularly computer terminals and other microprocessor systems, for converting unregulated DC input to plurality of varying voltage DC outputs. By adjusting the duty cycle as aforesaid, the regulator converts an unregulated input of, for example, twenty (20) to forty (40) volts to, for example, a regulated constant a twelve (12) volt output. In other words, the output voltage and current are dependent upon the duty cycle of the switching regulator.

SUMMARY OF THE INVENTION

In order to limit the current flow in any regulated power supply, it is necessary to sense the current being drawn by the load and adjust downward the duty cycle of the switching regulator in order to prevent overload on the output of the regulator.

Heretofore, current limiting circuits for switching regulators, such as the 3524, have required that the current be sensed in the negative lead of the power supply. Such sensing, of course, led to significant errors and difficulty in adjusting downward the duty cycle of the switching regulator in the event of current overload. Indeed, current spikes would frequently burn out or destroy the switching regulator before available current sensing circuits could "shut down" the switching regulator.

The circuit of the present invention allows current to be sensed in the positive lead or terminal of the power supply and thereby permits adjusting downward the duty cycle of the switching regulator rapidly enough that damage to the regulator is prevented upon occurrence of a current spike or overload.

Therefore, the primary object of this invention is to provide a current sensing circuit for switching regulators in which the current is sensed in the positive lead or terminal of the power supply and is capable of reducing down the duty cycle of the regulator before damage can occur.

It is a further object of the present invention to provide a regulated power supply having a constant output voltage which is protected from damage by current overloads.

Other objects, features, and advantages of the invention will become evident in light of the following detailed description considered in conjunction with the referenced drawing of a preferred exemplary system according to the invention.

DETAILED DESCRIPTION OF THE DRAWING

Figure 1:
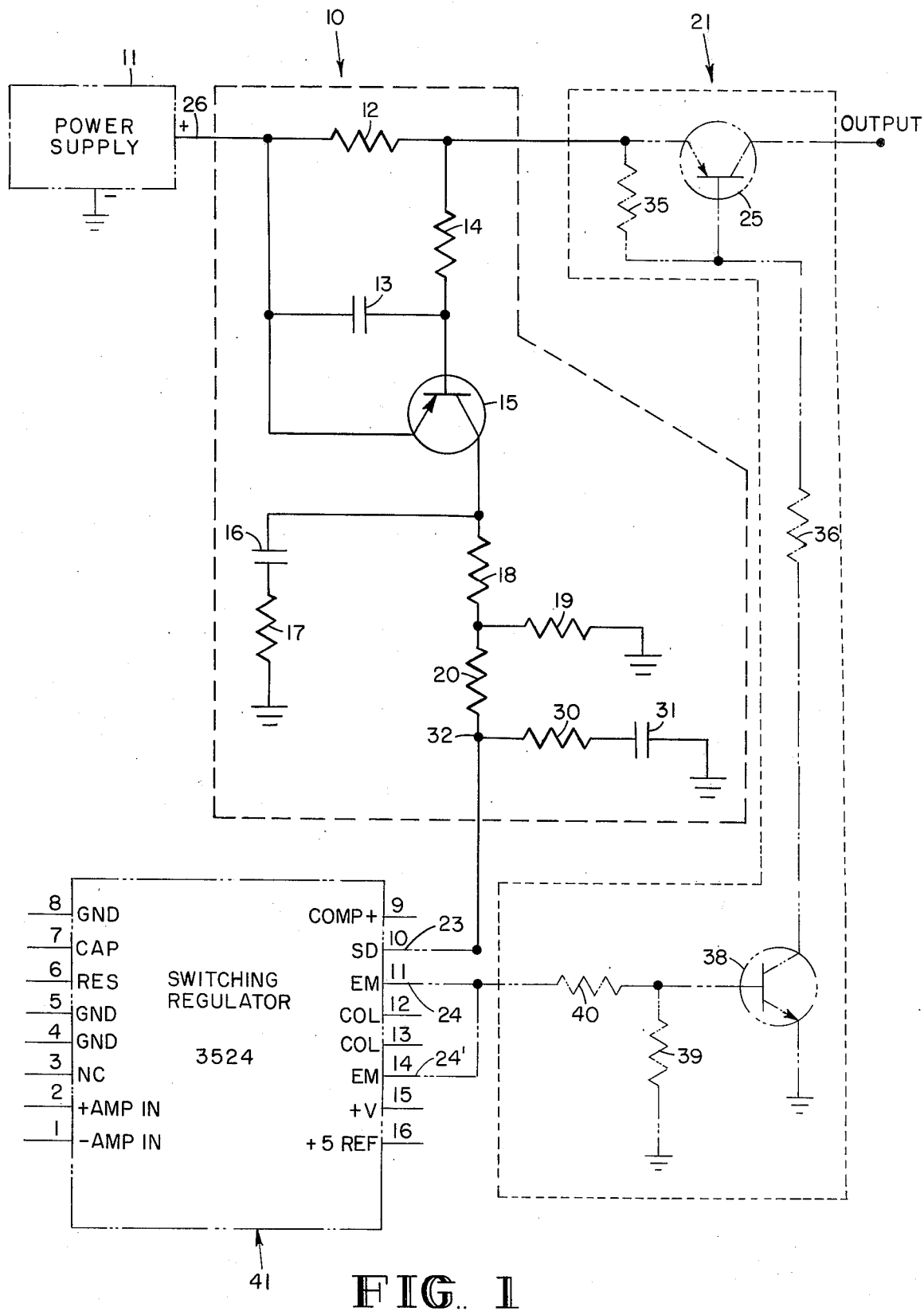

The FIGURE is a circuit schematic of the present invention.

DETAILED DESCRIPTION OF THE INVENTION

Referring to the FIGURE, an unregulated power supply 11 is connected on the positive power supply lead line or terminal 26 to a current limiting circuit 10 for switching regulator 41. Current limiting circuit 10 consists of a resistor 12 connected through resistor 14 to the base of transistor 15. Capacitor 13, as shown, is connected across resistors 12 and 14, and to the base of transistor 15. The emitter of transistor 15 is connected to the positive output of power supply 11 and to capacitor 13. The collector of transistor 15 is connected through resistors 18 and 20 to the shut-down signal position 23 of switching regulator 41. In the case of the Silicon General 3524 switching regulator, the shut-down signal position is pin 10. The node between resistors 18 and 20 is connected to ground through resistor 19. The collector of transistor 15 is also connected to ground through capacitor 16 and resistor 17. The base of transistor 15 is connected through resistor 14 to power switch 21.

Switch 21 may be comprised of, for example, a transistor 25 having its base connected through resistor 36 to the collector of transistor 38. The emitter of transistor 38 is connected to ground. The base of transistor 38 is connected through resistor 39 to ground and through resistor 40 to the emitter outputs 24 and 24' of the switching regulator. The emitter positions on the Silicon General 3524 are pins 11 and 14. The base of transistor 25 is also connected to the positive lead 26 of power supply 11 through resistor 12 and to the emitter of transistor 25 through resistor 35.

Thus, when the emitter outputs 24 and 24' of switching regulator 41 have a positive voltage output, transistor 38 conducts and its collector current through resistors 36 and 35 biases transistor 25 ON. When the emitter outputs 24 and 24' have a zero voltage output, transistor 38 is non-conducting and according transistor 25 is OFF and the switch is open. Thus, the output of switch 21 will be a square wave having a period and duty cycle equal to the period and duty cycle of the output of switching regulator 41, and having a regulated voltage which is a function of the duty cycle of the square wave.

Any one of the emitter outputs of a particular switching regulator may be used to drive switch 21 depending on the configuration of the switch.

Resistor 12 operates as a current sensing resistor. When the voltage drop across that resistor exceeds a predetermined value, transistor 15 turns on. Resistor 14 and capacitor 13 function as a resistor-capacitor (RC) filter to remove high-frequency spikes appearing across resistor 12. That filter prevents premature turn-on of transistor 15.

Capacitor 16, resistor 17, resistor 18, and resistor 20 function as a loop compensating and filtering circuit. The shut-down signal position on switching regulator 41 operates to reduce the duty cycle of the regulator. Thus, when transistor 15 turns ON, the duty cycle of regulator 41 is reduced and the current output is reduced. Reducing the current output the voltage drop across transistor 12 which would cause transistor 15 to turn off which in turn would allow the duty cycle of switching regulator 41 to increase, thereby also reduces the voltage drop across transistor 12 which would cause transistor 15 to turn OFF which in turn would allow the duty cycle of switching regulator 41 to increase, thereby increasing the output to maximum and so forth in a feedback loop. Capacitor 16, resistor 17, resistor 18, and resistor 20 serve to stabilize the loop.

When transistor 15 turns ON, capacitor 16 begins to charge. When capacitor 16 reaches a predetermined value, it discharges through resistors 18 and 20 into shut-down signal position 23 of switching regulator 41. Resistor 17 operates to prevent capacitor 16 from charging up too rapidly thereby resulting in over-correction, i.e. reducing the duty cycle too rapidly. Resistors 18, 19 and 20 serve to set the value to which capacitor 16 will be charged. That value is the voltage necessary to reduce the duty cycle in the switching regulator. Resistor 30 and capacitor 31, connected in series between node 32 and ground, determine the rate at which the voltage at node 32 can change. That is the rate at which the duty cycle of the switching regulator can change.

Therefore the feed-back loop is completely compensated, i.e. stable and nonoscillating.

As is thus apparent, the current in positive lead 26 from power supply 11 can be immediately sensed by the circuit of the present invention and used to rapidly shut-down or adjust downward the duty cycle of the switching regulator to prevent overload on the output. Additionally, the circuit of the present invention provides for a completely compensated, stable and nonoscillating current limiting circuit for switching regulators.

Although the invention has been described in conjunction with the foregoing specific embodiment, many alternatives, variations and modifications will be apparent to those of ordinary skill in the art. Those alternatives, variations and modifications are intended to fall within the spirit and scope of the appended claims.

I claim:

1. A current limiting circuit for a switching regulator comprising:
    a source of unregulated power having at least one positive terminal connected through a first switching means to a load;
    switching regulator means having at least one shut-down signal position for adjusting downward the duty cycle of the switching regulator, and at least one output, said output being operably connected to said first switching means whereby said switching means opens and closes in response to the output of said switching regulator, thereby alternately connecting and disconnecting said source of unregulated power to said load;
    current limiting means operably connected between the positive terminal of said source of unregulated power and said shut-down signal position of said switching regulator for adjusting downward the duty cycle of said switching regulator when current in the positive terminal of said source of unregulated power exceeds a predetermined value wherein said current limiting means comprises;
    current sensing means operably connected to the positive terminal of said source of unregulated power;
    circuit means for operably connecting said positive terminal to said shut-down signal position of said switching regulator when said current sensing means detects current in said positive terminal exceeding a predetermined value, wherein said circuit means comprises second switching means for connecting the positive terminal of said source of unregulated power to said shut-down signal position of said switching regulator and operably connected to said current sensing means whereby said second switching means connects said positive terminal to said shut-down signal position when said current sensing means detects current in said positive terminal exceeding a predetermined value; and filter means operably connected between said current sensing means and said second switch means for removing high-frequency spikes thereby preventing premature operation of said second switch means.

2. A current limiting circuit for a switching regulator comprising:

a source of unregulated power having at least one positive terminal connected through a first switching means to a load;

switching regulator means having at least one shut-down signal position for adjusting downward the duty cycle of the switching regulator, and at least one output, said output being operably connected to said first switching means whereby said switching means opens and closes in response to the output of said switching regulator, thereby alternatively connecting and disconnecting said source of unregulated power to said load;

current limiting means operably connected between the positive terminal of said source of unregulated power and said shut-down signal position of said switching regulator for adjusting downward the duty cycle of said switching regulator when current in the positive terminal of said source of unregulated power exceeds a predetermined value wherein said current limiting means comprises;

current sensing means operably connected to the positive terminal of said source of unregulated power;

circuit means for operably connecting said positive terminal to said shut-down signal position of said switching regulator when said current sensing means detects current in said positive terminal exceeding a predetermined value, wherein said circuit means comprises second switching means for connecting the positive terminal of said source of unregulated power to said shut-down signal position of said switching regulator and operably connected to said current sensing means whereby said second switching means connects said positive terminal to said shut-down signal position when said current sensing means detects current in said positive terminal exceeding a predetermined value; and loop compensating and filtering means operably connected between said second switch means and said shut-down signal position for preventing feed-back oscillation in said current limiting circuit.

3. A current limiting circuit for a switching regulator as set forth in claim 2 further comprising means for pre-setting the rate at which the duty cycle of the switching regulator can change.

4. A current limiting circuit for switching regulators having at least one shut-down signal position for adjusting downward the duty cycle of the switching regulator comprising:

current limiting means operably connected between the positive terminal of a source of unregulated power and said shutdown signal position of said switching regulator for adjusting downward the duty cycle of said switching regulator when current in the positive terminal of said source of unregulated power exceeds a predetermined value wherein said current limiting means comprises current sensing means operably connected to the positive terminal of said source of unregulated power, and switching means for connecting said positive terminal of said source of unregulated power to said shut-down signal position of said switching regulator and operably connected to said current sensing means whereby said switching means operably connects said positive terminal to said shut-down signal position when said current sensing means detects current in said positive terminal exceeding a predetermined value; and loop compensating and filtering means operably connected between said switch means and said shutdown signal position for preventing feedback oscillation in said current limiting circuit.

5. A current limiting circuit for a switching regulator as set forth in claim 4 further comprising means for presetting the rate at which the duty cycle of said switching regulator can change.

* * * * *